(12) United States Patent
Takahashi

(10) Patent No.: US 11,216,072 B2
(45) Date of Patent: Jan. 4, 2022

(54) INFORMATION PROCESSING APPARATUS, INFORMATION PROCESSING METHOD, AND PROGRAM

(71) Applicant: SONY CORPORATION, Tokyo (JP)

(72) Inventor: Kei Takahashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 233 days.

(21) Appl. No.: 16/305,701

(22) PCT Filed: May 19, 2017

(86) PCT No.: PCT/JP2017/018811
§ 371 (c)(1),
(2) Date: Nov. 29, 2018

(87) PCT Pub. No.: WO2018/020792
PCT Pub. Date: Feb. 1, 2018

(65) Prior Publication Data
US 2020/0379573 A1    Dec. 3, 2020

(30) Foreign Application Priority Data

Jul. 25, 2016   (JP) .............................. JP2016-145621

(51) Int. Cl.
*G06F 3/01*   (2006.01)
*G06F 1/16*   (2006.01)

(52) U.S. Cl.
CPC ............. *G06F 3/017* (2013.01); *G06F 1/163* (2013.01)

(58) Field of Classification Search
CPC .................................. G06F 3/017; G06F 1/163
See application file for complete search history.

(56) References Cited

U.S. PATENT DOCUMENTS

| 2015/0185837 A1* | 7/2015 | Whitney ................. G06F 3/017 345/156 |
| 2016/0018872 A1* | 1/2016 | Tu .......................... G06F 1/3234 345/173 |
| 2017/0003747 A1* | 1/2017 | Carceroni ............. G06F 1/3215 |

FOREIGN PATENT DOCUMENTS

| JP | H05-292261 A  | 11/1993 |
| JP | 2005-018810 A | 1/2005  |
| JP | 2011-511931 A | 4/2011  |
| JP | 2013-020311 A | 1/2013  |

(Continued)

*Primary Examiner* — Kenneth B Lee, Jr.
(74) *Attorney, Agent, or Firm* — Paratus Law Group, PLLC

(57) ABSTRACT

There is provided an information processing apparatus including a signal generation unit, a first determination unit, and a second determination unit. The signal generation unit processes an output of a sensor unit attached to a detection target, and generates a trigger signal at a time when a state change of the detection target is detected. The first determination unit is brought out of hibernation and activated when receiving the trigger signal, determines the state change of the detection target from the output of the sensor unit by a first determination criterion, and outputs a determination impossibility signal in a case where the determination is impossible. The second determination unit is brought out of hibernation and activated when receiving the determination impossibility signal, and determines the state change of the detection target from the output of the sensor unit by a second determination criterion different from the first determination criterion.

14 Claims, 10 Drawing Sheets

(56) References Cited

FOREIGN PATENT DOCUMENTS

| | | |
|---|---|---|
| JP | 2015-125616 A | 7/2015 |
| JP | 2015-125766 A | 7/2015 |
| JP | 2015-179493 A | 10/2015 |
| JP | 2015-186183 A | 10/2015 |
| JP | 2016-502721 A | 1/2016 |
| WO | WO 2009/008411 A1 | 1/2009 |

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2017/018811 (filed on May 19, 2017) under 35 U.S.C. § 371, which claims priority to Japanese Patent Application No. 2016-145621 (filed on Jul. 25, 2016), which are all hereby incorporated by reference in their entirety.

TECHNICAL FIELD

The present technology relates to an information processing apparatus, an information processing method, and a program which can be applied to a wearable device.

BACKGROUND ART

In recent years, various wearable devices including glasses type and watch type have been developed. For example, Patent Literature 1 discloses a wristband type display control apparatus provided with a control unit, an input unit, a sensor unit, a storage unit, a communication unit, a display unit, and the like. Further, Patent Literature 2 discloses an electronic apparatus capable of attaining a long lifetime of a battery while suppressing power consumption of the apparatus.

CITATION LIST

Patent Literature

Patent Literature 1: Japanese Patent Application Laid-open No. 2015-125616
Patent Literature 2: WO 2009/008411

DISCLOSURE OF INVENTION

Technical Problem

These days, there is a growing demand for lower power consumption of electronic apparatuses such as wearable devices, in addition to downsizing and higher performance of those. To achieve this, for example, a detection of a user's significant gesture input with basic electric power is demanded.

In view of the circumstances as described above, an object of the present technology is to provide an information processing apparatus, an information processing method, and a program which can perform a detection of a change in state of a user with basic electric power.

Solution to Problem

An information processing apparatus according to an embodiment of the present technology includes: a signal generation unit, a first determination unit, and a second determination unit.

The signal generation unit processes an output of a sensor unit attached to a detection target, and generates a trigger signal at a time when a state change of the detection target is detected.

The first determination unit is brought out of hibernation and activated when receiving the trigger signal, determines the state change of the detection target from the output of the sensor unit by a first determination criterion, and outputs a determination impossibility signal in a case where the determination is impossible.

The second determination unit is brought out of hibernation and activated when receiving the determination impossibility signal, and determines the state change of the detection target from the output of the sensor unit by a second determination criterion different from the first determination criterion.

In the information processing apparatus, the first determination unit is configured to be started at a time when the state change of the detection target is detected, and the second determination unit is configured to be started in a case where determination by the first determination unit is impossible. As a result, it is possible to determine the state of the detection target while suppressing power consumption.

The signal generation unit may be configured to detect a motion of a user who wears the detection target from the state change of the detection target, and the first determination unit and the second determination unit is configured to determine, on the basis of a mode of the motion of the user, whether a corresponding gesture candidate exists or not from among a plurality of gesture candidates set in advance.

The first determination unit may be configured to execute a first determination process of specifying a gesture candidate corresponding to the mode of the motion of the user from among the plurality of gesture candidates, and output the determination impossibility signal in a case where specifying the gesture candidate is impossible.

The second determination unit may execute a second determination process of specifying a gesture candidate having a highest correlation with the mode of the motion of the user from among the plurality of gesture candidates.

The information processing apparatus may further include a setting unit that sets the plurality of gesture candidates. In this case, the signal generation unit may change a standard by which the trigger signal is generated in accordance with a kind of the plurality of gesture candidates set.

The signal generation unit may detect a motion of an arm of the user who wears the detection target, and the first determination unit and the second determination unit each may specify any one of a raising operation, a lowering operation, a twisting operation, and a shaking operation of the arm of the user.

The first determination unit and the second determination unit may be brought into hibernation again after the state change of the detection target is determined.

The information processing apparatus may further include a buffer memory capable of chronologically storing the output of the sensor unit.

An information processing method according to an embodiment of the present technology includes bringing out of hibernation and activating a first determination unit which determines a state change of a detection target by a first determination criterion, when the state change of the detection target is detected on the basis of an output of a sensor unit attached to the detection target.

A second determination unit which determines the state change of the detection target by a second determination criterion different from the first determination criterion is brought out of hibernation and activated, when the first determination unit is incapable of performing determination.

A program according to an embodiment of the present technology causes a computer to execute the steps of:

bringing out of hibernation and activating a first determination unit which determines a state change of a detection target by a first determination criterion, when the state change of the detection target is detected on the basis of an output of a sensor unit attached to the detection target; and bringing out of hibernation and activating a second determination unit which determines the state change of the detection target by a second determination criterion different from the first determination criterion, when the first determination unit is incapable of performing determination.

Advantageous Effects of Invention

As described above, according to the present technology, it is possible to detect the state change of the user with basic electric power.

It should be noted that the effects described herein are not necessarily limited, and any effect described in this disclosure may be obtained.

MODE(S) FOR CARRYING OUT THE INVENTION

Hereinafter, embodiments of the present technology will be described with reference to the drawings.

First Embodiment

Figure 1:
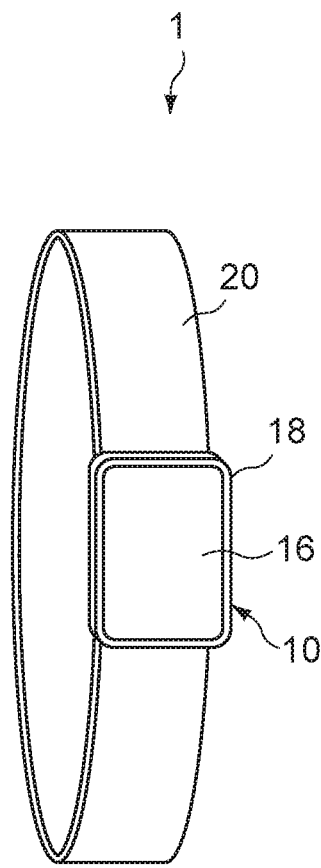
FIG. 1 A schematic perspective view showing an information processing apparatus according to a first embodiment of the present technology.
Figure 1:
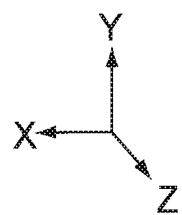

FIG. 1 is a schematic perspective view showing an information processing apparatus according to an embodiment of the present technology. An information processing apparatus 1 according to this embodiment is configured by a watch type or wristband type wearable device.

The information processing apparatus 1 in this embodiment has a basic function of displaying a time or the like and a gesture recognition function of detecting a motion of an arm of a user and switching a display or control. It should be noted that the information processing apparatus 1 may be used as a terminal apparatus capable of performing transmission and reception of e-mail or the like, browse of web information, and measurement, management, and the like of biological information of the user in accordance with a specification thereof.

[Overall Configuration]

The information processing apparatus 1 includes a main body 10 and a band unit 20 which supports the main body 10 and is put on the arm of the user.

Figure 2:
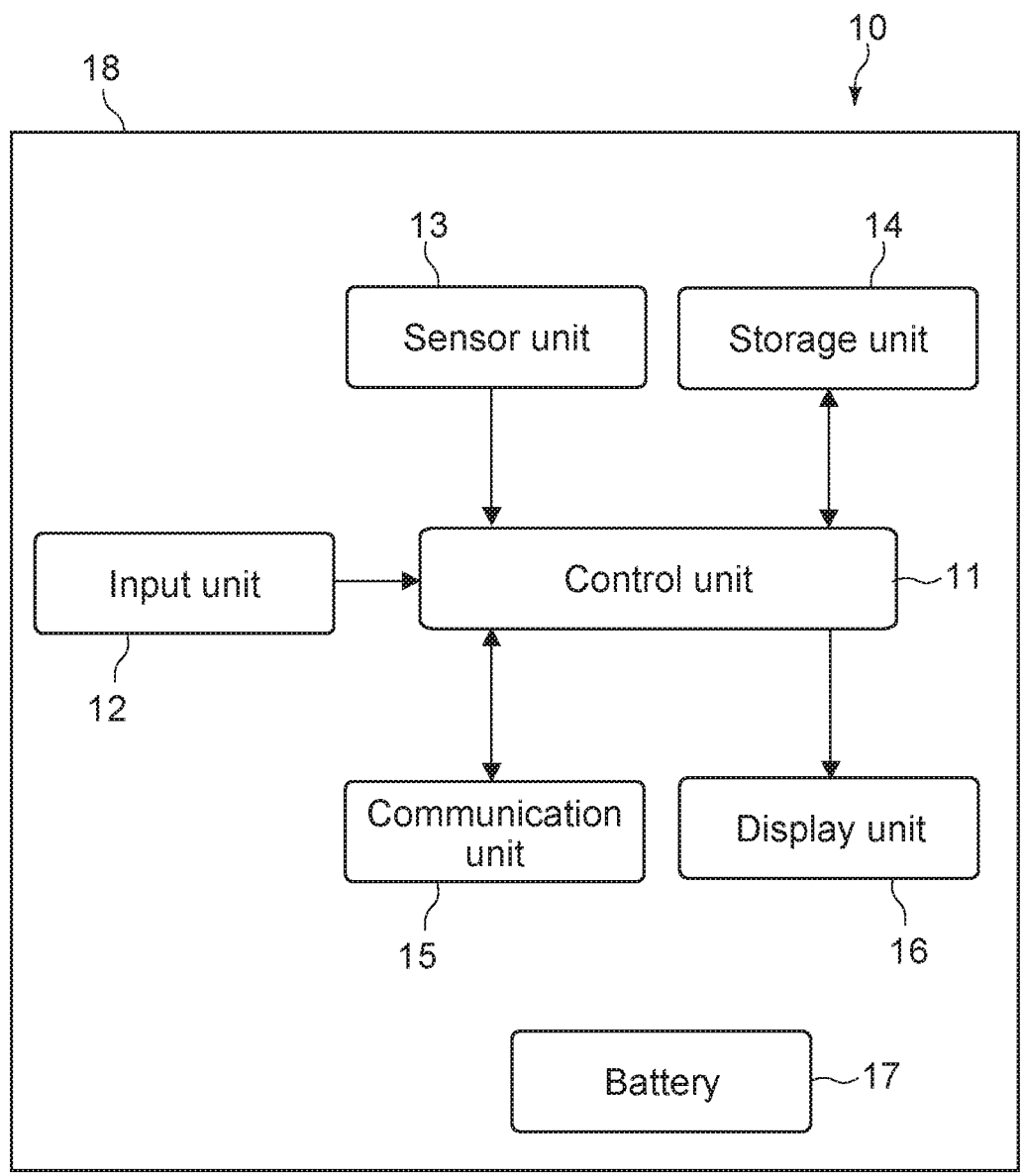
FIG. 2 A block diagram for explaining a configuration of the information processing apparatus.

FIG. 2 is a block diagram for explaining the configuration of the main body 10.

The main body 10 includes a control unit 11, an input unit 12, a sensor unit 13, a storage unit 14, a communication unit 15, a display unit 16, a battery 17, and a casing 18 which contains those.

The control unit 11 is configured by a computer, and performs control of an entire operation of the information processing apparatus 1 by executing a program stored in the storage unit 14 or another storage medium. Typically, the control unit 11 includes one or a plurality of processors such as a CPU (Central Processing Unit), a GPU (Graphics Processing Unit), a DSP (Digital Signal Processor), and an SoC (System on Chip).

As will be described later, on the basis of an output of the sensor unit 13, from a motion of an arm and a posture change of the user who wears the information processing apparatus 1, the control unit 11 determines whether a significant gesture input of the user exists or not and a kind thereof, and controls the communication unit 15, the display unit 16, and the like in accordance with a determination result thereof.

Further, as will be described later, the control unit 11 is configured to reduce the power consumption of the battery 17 in such a manner that the display unit 16 is turned off, or the gesture determination is not performed until a significant operation of the user is detected.

The input unit 12 receives an input operation by the user and outputs the received operation to the control unit 11. The input unit 12 may be constituted of various devices such as keys and switches, or may be constituted of a touch sensor. In a case where the input unit 12 is constituted of the touch sensor, the input unit 12 may be configured integrally with the display unit 16.

The sensor unit 13 detects an acceleration that acts on the casing 18, and outputs the acceleration to the control unit 11. The sensor unit 13 mainly has a function of detecting the motion of the arm and the posture of the user who wears the information processing apparatus 1.

Typically, the sensor unit 13 is constituted of a sensor unit including an acceleration sensor capable of detecting accelerations in triaxial directions orthogonal to one another (X, Y and Z axis directions in FIG. 1. The same holds true for the following). A sampling frequency of the sensor unit 13 can be set as appropriate, for example, set to 8 Hz.

The acceleration sensor may be constituted of a plurality of sensors that detect accelerations of the respective axes or a single sensor. Further, the sensor unit 13 may include not only the acceleration sensor but also another motion sensor such as an angular velocity sensor, a biological sensor capable of detecting a body temperature, a pulse rate, or perspiration, or the like of a user.

The storage unit 14 is typically constituted of a semiconductor memory, and stores a program for causing the control unit 11 to operate, a parameter, a function, and the like necessary to detect the motion of the user and determine a gesture. Further, the storage unit 14 is configured to be capable of storing various data to be used by the program.

Further, the storage unit 14 stores various application software to be executed by the control unit 11.

The communication unit 15 is configured to be capable of being communicated with a handheld terminal, a server, another information processing apparatus 1, or the like in a wireless or wired manner. Typically, the communication unit 15 is configured to be capable of being communicated with a handheld terminal (smart phone, mobile phone, laptop personal computer, or the like) of a user who wears the information processing apparatus 1. The communication unit 15 includes a communication circuit, an antenna, or the like, transmits an output of the control unit 11 to the handheld terminal, or receives input information from the handheld terminal and outputs to the control unit 11.

The display unit 16 receives a display control signal from the control unit 11 and displays various information, and constitutes a screen of the information processing apparatus 1. The display unit 16 typically includes a display element such as an LCD (Liquid Crystal Display) an organic EL (Electro-Luminescence) display. On a basis of an instruction from the control unit 11, the display unit 16 displays various images such as a time, input keys, reception information, and measurement information.

The battery 17 supplies electric power necessary for an operation of the main body 10, and is typically constituted of an electricity storage element such as a primary battery and a secondary battery. Further, the battery 17 may be constituted of a power generation element capable of generating electric power by solar light, vibrations, or the like.

The casing 18 is a casing made of metal or a synthetic resin and has a thin, rectangular parallelepiped shape in this embodiment. The shape is not limited to this. The casing 18 may be formed in a disc shape or another geometric shape. The casing 18 can be put on the user through the band unit 20.

In this embodiment, the sensor unit 13 sets the casing 18 as a detection target. The control unit 11 determines a motion of an arm (gesture) of the user through a change in posture of the casing 18. Alternatively, the sensor unit 13 may be directly put on the arm of the user.

[Configuration of Control Unit]

Figure 3:
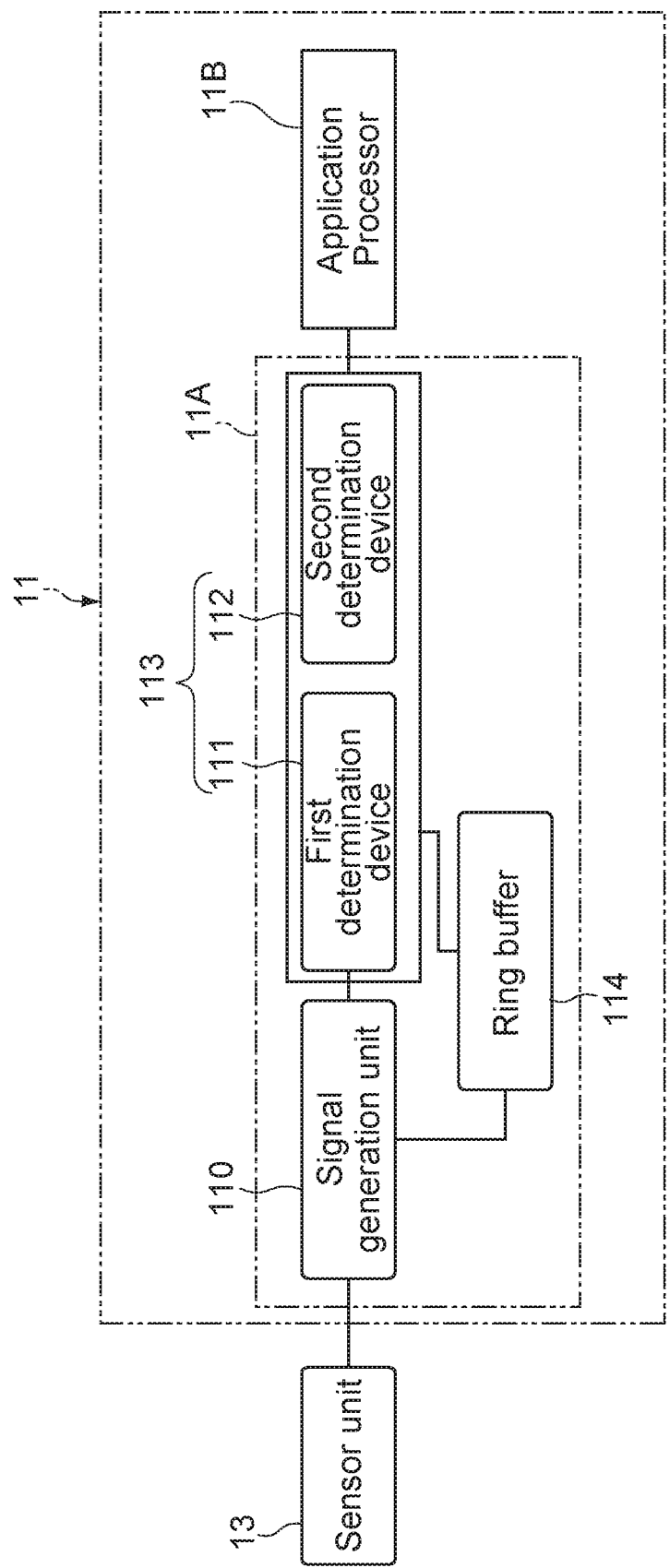
FIG. 3 A block diagram showing a configuration of a control unit in the information processing apparatus.

Subsequently, the control unit 11 will be described in detail. FIG. 3 is a block diagram showing a configuration of the control unit 11. The control unit 11 detects the motion of the arm of the user, and performs a predetermined process in accordance with the motion.

The control unit 11 includes a determination circuit unit 11A and an execution circuit unit 11B. The determination circuit unit 11A is a circuit which determines whether the motion of the user detected by the sensor unit 13 is significant information for gesture determination or not. The execution circuit unit 11B is a main processor which executes various applications in accordance with the determined gesture operation.

The determination circuit unit 11A includes a signal generation unit 110, a determination unit 113, and a ring buffer 114. The determination unit 113 includes a first determination device 111 and a second determination device 112.

(Signal Generation Unit)

The signal generation unit 110 processes an output of the sensor unit 13 and generates a trigger signal at a time of detecting a state change relating to a posture of the user.

In this embodiment, the signal generation unit 110 processes an output of the sensor unit 13, and detects whether there is a state change relating to the posture of the user or not. The state change relating to the posture of the user means the motion of the arm of the user specifically. At a time when the signal generation unit 110 detects the motion of the user, the signal generation unit 110 generates a trigger signal to the determination unit 113. The signal generation unit 110 is operated at all times from a startup of the information processing apparatus 1 to monitor the output of the sensor unit 13.

Figure 4:
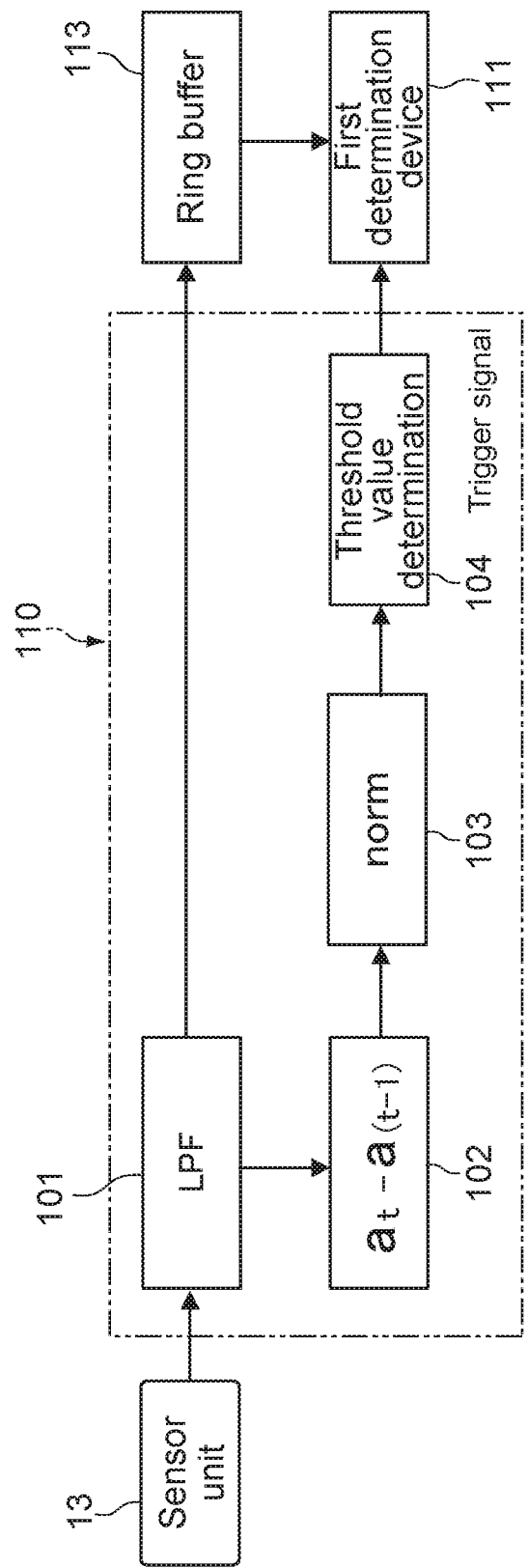
FIG. 4 A block diagram showing a configuration example of a signal generation unit in the control unit.

FIG. 4 is a block diagram showing a configuration example of the signal generation unit 110.

The signal generation unit 110 includes a low-pass filter (LPF) 101, a difference circuit 102, a norm calculation circuit 103, and a threshold value determination circuit 104.

The LPF 101 is a filter function for removing an unnecessary noise from the output of the sensor unit 13 (acceleration signal in each triaxial direction) and detecting a gesture which should be truly evaluated. A cutoff frequency of the LPF 101 is set to an appropriate value (for example, 4 Hz) which enables removing of a high frequency component of the acceleration signal which can be generated during walking, running, or boarding on a vehicle by the user. An output of the LPF 101 is output to the difference circuit 102 and the ring buffer 114.

The signal generation unit 110 has a determination function that a temporal differentiation is performed for the acceleration signals in the triaxial directions output from the LPF 101 by the difference circuit 102 respectively, and a norm is calculated by the norm calculation circuit 103. The threshold value determination circuit 104 determines whether a value of the determination function exceeds a preset threshold value or not. The threshold value determination circuit 104 has a unique threshold value for each of the triaxial directions, and generates, in a case where at least one of norm values of the axes exceeds the threshold value, a trigger signal to output the signal to the first determination device 111.

(First Determination Device)

The first determination device 111 is brought out of hibernation (sleep state) and activated upon reception of the trigger signal, determines the motion of the arm of the user from the output of the sensor unit 13 by a first determination criterion, and outputs a determination impossibility signal in a case where the determination cannot be performed.

For the first determination device 111, a simple CPU having a relatively low processing speed can be used. The first determination device 111 maintains hibernation until the signal generation unit 110 generates the trigger signal, and reduces power consumption of the battery 17.

Figure 6:
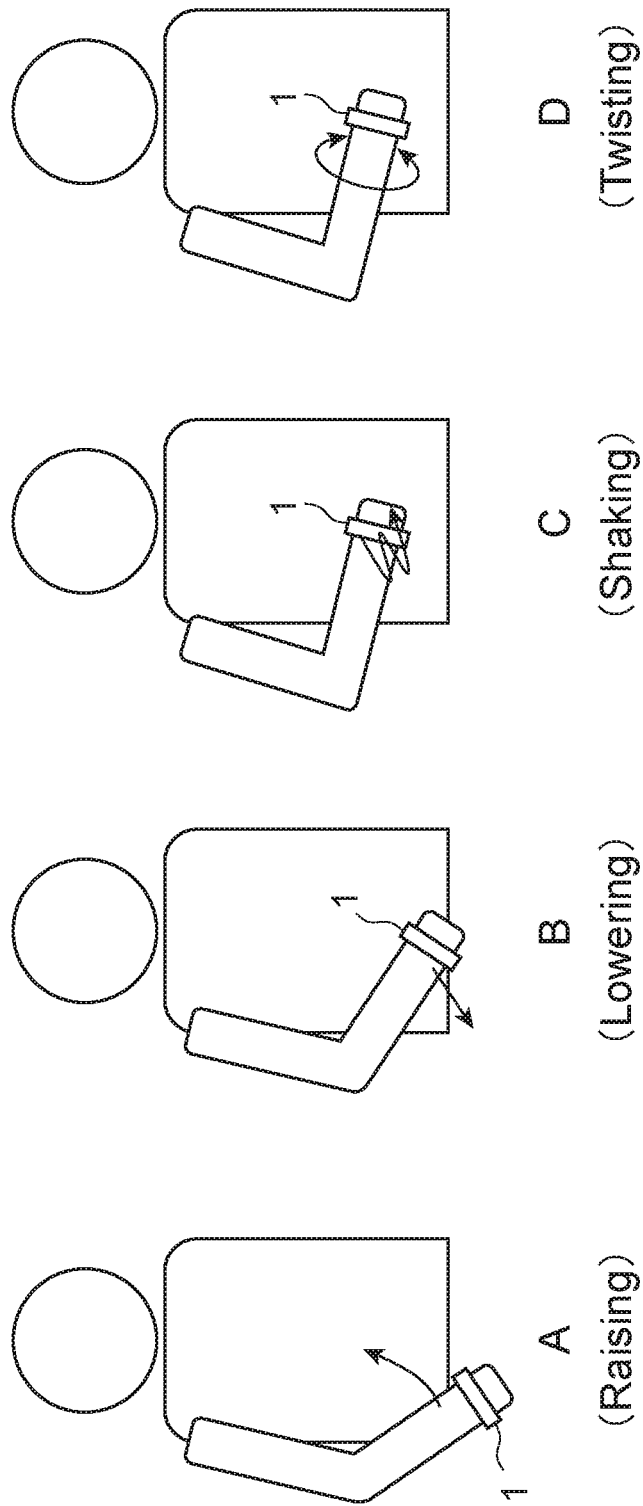
FIG. 6 Schematic diagrams each showing an example of a gesture.

On a basis of a mode of the motion of the user, the first determination device 111 determines whether there is a corresponding gesture candidate from a plurality of preset gesture candidates or not by the first determination criterion. For the mode of the motion of the user, output data of the LPF 101 which is stored in the ring buffer 114 is referenced. To perform the determination of the gesture candidate, the plurality of gesture candidates stored in the storage unit 14 is referenced. The plurality of gesture candidates are not particularly limited. The plurality of gesture candidates include a raising operation of the arm of the user, a lowering operation thereof, a shaking operation thereof, a twisting operation thereof, and the like, for example (see FIG. 6).

At this time, the first determination device 111 performs a first determination process for specifying a gesture candidate corresponding to the mode of the motion of the user from among the plurality of gesture candidates.

As the first determination process, for example, a relatively simple algorism is executed. By the algorism, from among the plurality of gesture candidates stored in the storage unit 14, a gesture candidate having data corresponding to acceleration data for underpinning the mode of the motion of the user is specified. At a time when the gesture candidate is specified in the first determination process, the first determination device 111 outputs information related to the specified gesture candidate to the execution circuit unit 11B.

On the other hand, in the first determination process, when it is impossible to specify the gesture candidate, the first determination device 111 outputs the determination impossibility signal. The time when it is impossible to specify the gesture candidate include a time when it is impossible to recognize which gesture candidate the mode corresponds to.

(Second Determination Device)

The second determination device 112 is brought out of the hibernation and activated upon reception of the determination impossibility signal, and determines a posture of the casing 18 from the output of the sensor unit 13 by a second determination criterion different from the first determination criterion.

The second determination device 112 is constituted of a CPU having a higher performance than the first determination device 111, for example, involving a larger power consumption, a higher calculation capability, or a higher processing speed than the first determination device 111, or a combination of those. The second determination device 112 maintains the hibernation until the first determination device 111 generates the determination impossibility signal, with the result that power consumption of the battery 17 is reduced.

On a basis of the mode of the motion of the user, the second determination device 112 determines whether there is a corresponding gesture candidate from the preset plurality of gesture candidates. For the mode of the motion of the user, output data of the LPF 101 stored in the ring buffer 114 is referenced, and for the determination of the gesture candidate, the plurality of gesture candidates stored in the storage unit 14 are referenced.

At this time, the second determination device 112 performs a second determination process of specifying a gesture candidate having a highest correlation with the mode of the motion of the user from among the plurality of gesture candidates.

As the second determination process, an advanced algorism as compared to the first determination process is executed. For example, it is possible to use an algorism with a relatively larger computation amount like computation using a determination device of machine learning. By using an advanced determination criterion as described above, it is possible to specify, with high accuracy, a gesture candidate with a greater probability, which is a gesture candidate that coincides with an intension of the user.

Information related to the gesture candidate specified in the second determination process is output to the execution circuit unit 11B. The information related to the gesture candidate may be output from the first determination device 111 or may be output from the second determination device 112.

The first determination device 111 and second determination device 112 are shifted to the hibernation again at a time when the information related to the specified gesture candidate is output to the execution circuit unit 11B, or at a time when it is determined that there is no gesture candidate corresponding to the motion of the user, with the result that the power consumption of the battery 17 is suppressed. In particular, the second determination device 112 requires a larger power consumption than the first determination unit 111, so the hibernation of the second determination device 112 brings about a large advantage in a reduction of the power consumption.

(Ring Buffer)

The ring buffer 114 is constituted of a buffer memory capable of storing the output of the sensor unit 13 (acceleration signal in each triaxial direction) in a chronological order. The ring buffer 114 only has to have such a capacity that there is an information amount used to specify the gesture candidate corresponding to the motion of the user in the first and second determination devices 111, 112, for example, only has to have such a capacity that sensor information of past one second can be accumulated.

[Operation of Information Processing Apparatus]

Figure 5:
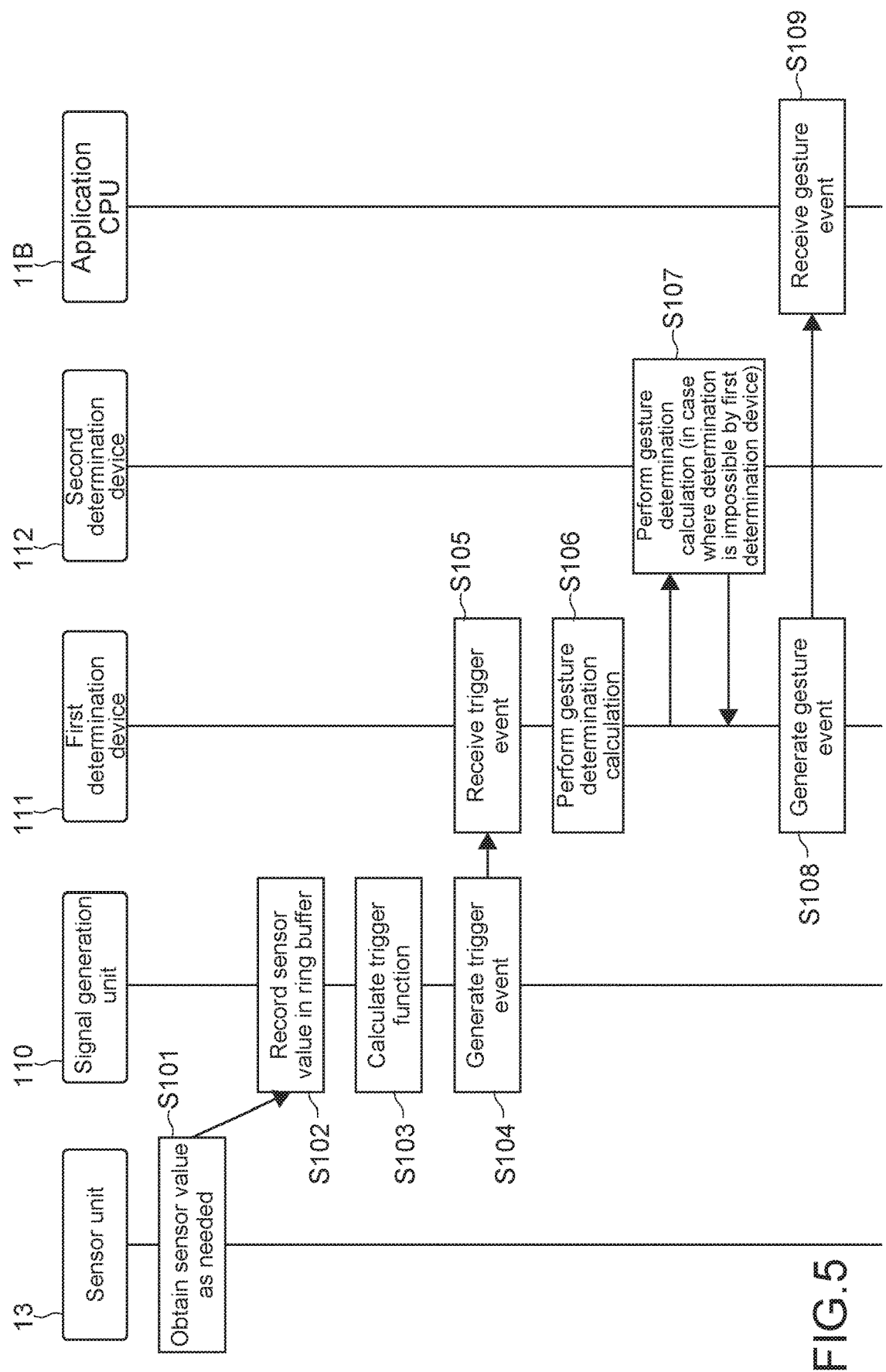
FIG. 5 A sequence diagram showing a typical operation example of the information processing apparatus.

Subsequently, an information processing method according to this embodiment will be described with an operation of the information processing apparatus 1. FIG. 5 is a sequence diagram showing a typical operation example of the information processing apparatus 1. In this case, a flow of the gesture recognition will be described.

The sensor unit 13 reads the value of the acceleration sensor of each axis at a predetermined time interval. After that, the sensor unit 13 applies the filter function (LPF 101), and calculates a trigger determination function (difference circuit 102, norm calculation circuit 103). When a condition that the value exceeds a fixed value is satisfied, for example, the sensor unit 13 performs a trigger generation event (generate a trigger signal) (Steps 101 to 104).

When the trigger is generated, the determination unit 113 is started up, and a gesture detection process is performed. At a time of detecting a gesture, the output of the sensor unit 13 before the trigger is generated is held in the ring buffer 114, so the output is also used to perform the calculation.

An algorism of the gesture detection is divided into a plurality of algorisms. First, an algorism which is light but is less accurate is calculated by the first determination device 111 (Steps 105, 106). As a result, in a case where it is possible to perform clearly recognition as the gesture, a gesture event is generated (Step 108). On the other hand, in a case where the gesture detection is not achieved with this algorism, but there is a possibility of the gesture, the second determination device 112 is started up to perform a more accurate process, thereby performing the determination (Step 107). For this process, a determination device by machine learning may be used. When whether the gesture is detected or not is determined, and a remaining process is also terminated, the first and second determination devices 111, 112 are returned to the hibernation again.

In the example of the figure, when the gesture is recognized in the second determination device 112, the gesture event is generated in the first determination device 111. Alternatively, in the second determination device 112, the gesture event may be generated. At a time when receiving the gesture event, the execution circuit unit 11B executes application software on the basis of information related to the recognized or specified gesture candidate (Step 109).

It should be noted that as a condition of starting up the determination unit 113, in addition to the trigger from the sensor unit 13, an interrupt at a fixed time, an operation by the user, or the like can be used. A fixed-time interrupt refers to resetting by calculating appropriateness of the trigger on the basis of a movement intensity or the like regularly, because there is a case where when the condition of the trigger is strictly set at a time when a motion is strenuous or the like, the motion is reduced thereafter, and the trigger is not appropriate.

FIGS. 6A to 6D are schematic diagrams each showing an example of a kind of the gesture. A shows an arm raising operation, B shows an arm lowering operation, C shows an arm shaking operation, and D shows an arm twisting operation.

The raising operation shown in FIG. 6A is recognized by an output of the acceleration sensor in the Z axis direction principally. When the raising operation is recognized, this is estimated as an operation of confirming a display with a display surface of the display unit 16 of the information processing apparatus 1 lifted upwards by the user. In this case, for example, the display unit 16 maintained to be a light-out state is lighted, and displays predetermined information such as a current time.

The lowering operation shown in FIG. 6B is recognized by the output of the acceleration sensor in the Z axis direction principally. When the lowering operation is recognized, this is estimated as termination of confirming the display unit 16 by the user. Thus, in this case, for example, the display unit 16 shifted from the lighted state to the light-out state.

The shaking operation shown in FIG. 6C is recognized by the output of the acceleration sensor in the Z axis direction principally. Further, the twisting operation shown in FIG. 6D is recognized by outputs of the acceleration sensors in an X axis direction and a Y axis direction principally. When the shaking operation or the twisting operation is recognized, for example, application software corresponding to those is executed. Alternatively, selecting music to be reproduced by the handheld terminal or the like, adjusting a volume, or the like may be performed.

As described above, the information processing apparatus 1 in this embodiment has the gesture recognition function for recognizing the motion of the user. Therefore, it is possible to perform an input operation without operating a button or a touch panel, which improves convenience of the user.

Further, in this embodiment, the determination unit 113 for the gesture recognition is divided into the simple CPU (first determination device 111) which involves a relatively low processing speed and the high-performance CPU (second determination device 112) which involves a relatively high processing speed, and stands by in a hibernation mode until the trigger is generated. Further, when the trigger is generated, first, the first determination device 111 is started up. The second determination device 112 is started up in a case where determination by the first determination device 111 is impossible. As a result, an average power consumption of the control unit 11 can be significantly reduced, so it is possible to recognize the gesture corresponding to the motion of the user while minimizing the power consumption.

Further, according to this embodiment, during the hibernation of the determination unit 113, the output of the sensor unit 13 is accumulated in the ring buffer 114 in a chronological order. Thus, it is possible to achieve the gesture recognition process with accuracy similar to a case where the determination unit 113 is activated at all times.

Subsequently, a description will be given on a method of sharing the gesture recognition process by the first determination device 111 and the second determination device 112.

Generally, at a time when a motion of a gesture and a motion which is not a gesture are determined from each other, a motion which is obviously not a gesture can be determined by a relatively simple calculation in some cases. For example, in a case where a sensor value (output of the sensor unit 13) is a certain value and is not completely changed, a possibility that this is a gesture is 0. If a bit more complicated motion is caused, for example, in a case where the display unit 16 is directed downwards in a raising gesture, a possibility that this is a raising gesture to look at a watch is slim.

In contrast, there is a case where a complicated movement is caused in the sensor value to some extent, and only a simple computation cannot lead to determination of whether the gesture is generated or not. For example, in an example of the raising gesture, by a simple computation by the first determination device 111, a motion from a state of lowering an arm to a state of lifting the arm can be recognized as the raising gesture. However, for a motion in a state in which the arm is lifted, the second determination device 112 has to be determine whether the user really wants to watch a screen or not by using a complicate determination algorism. For the complicated determination algorism, a method of adopting a machine learning device such as Deep Learning may be used. It should be noted that for the simple computation in the first determination device 111, a rule-based method without using machine learning may be used, or a determination device for simple machine learning which is significantly simple as compared to a machine learning device in a later stage may be used.

An example will be described in which at a time when a plurality of gestures are recognized, depending on a kind of a gesture to be recognized, the first and second determination devices 111, 112 are used differently. In this case, a wristband terminal for detecting an arm raising or arm lowering operation and a finger tapping operation is considered.

In a state in which the arm is raised, a terminal determines both of the arm lowering operation and the finger tapping operation by using the acceleration sensor. Here, the arm lowering operation is a large motion and thus easily determined, so the operation can be processed in the first determination device 111. On the other hand, determination of the finger tapping requires a high-speed computation using the determination device of machine learning, so the operation is necessary to be processed in the second determination device 112. In this case, an assumption is made that recognizing a gesture is carried out by only one kind at one time. In this case, if there is a motion of some sort, the first determination device 111 recognizes an arm lowering motion. If the motion is recognized, it is unnecessary to determine the finger tapping, so the second determination device 112 is not used. On the other hand, in a case where the arm lowering motion cannot be recognized, and a possibility of the finger tapping is detected with a simple rule-based filter, the second determination device 112 performs a determination process for the finger tapping.

Second Embodiment

Figure 7:
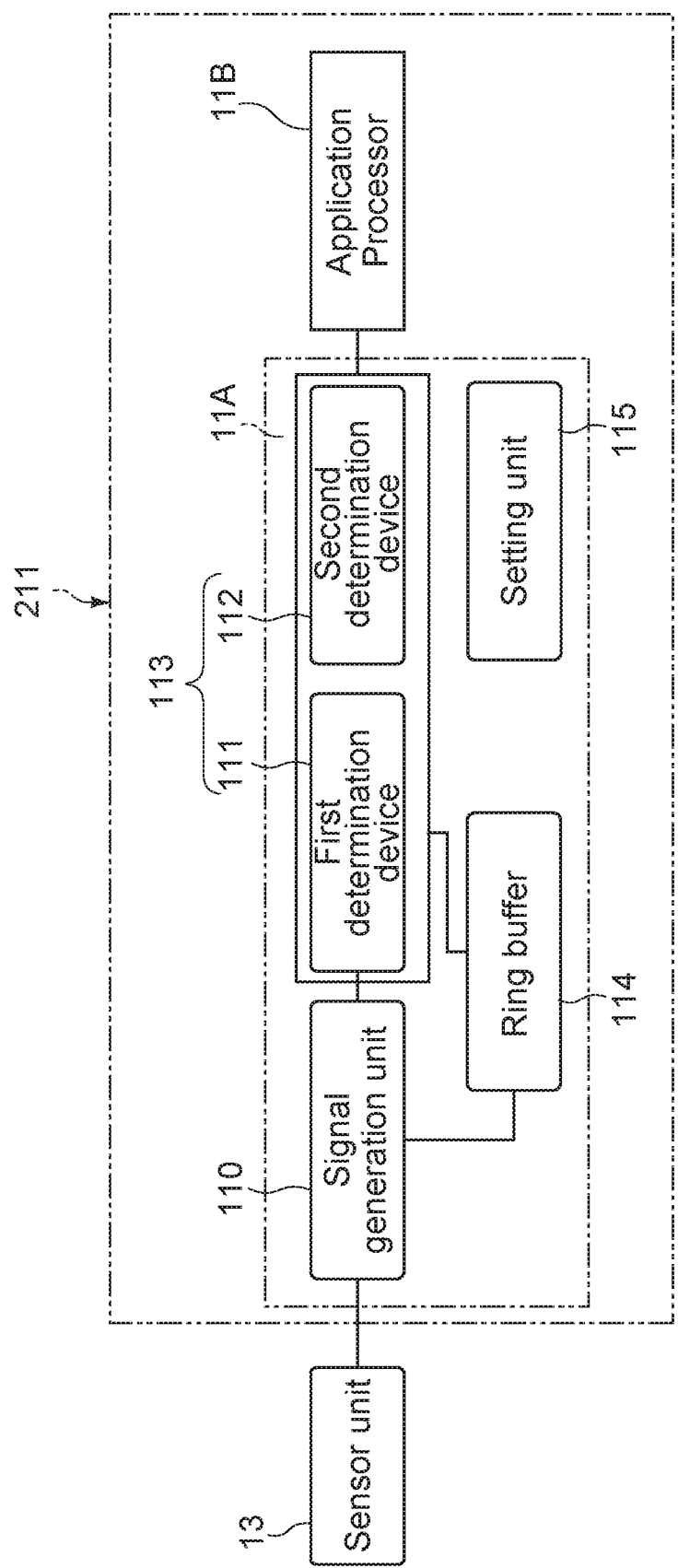
FIG. 7 A block diagram showing a configuration an information processing apparatus according to a second embodiment of the present technology.

FIG. 7 is a block diagram showing a configuration of a control unit 211 in an information processing apparatus according to a second embodiment of the present technology. In the following, a configuration different from the first embodiment will be mainly described. Similar configurations to those of the first embodiment will be denoted by similar reference numerals or symbols, and a description of those will be omitted or simplified.

This embodiment is different from the first embodiment in that the control unit 211 includes a setting unit 115. Upon reception of a request from the execution circuit unit 11B, the setting unit 115 sets a plurality of gesture candidates to be recognized.

Typically, the determination circuit unit 11A that executes the gesture recognition performs the gesture recognition upon reception of a request from the execution circuit unit 11B that uses the gesture specified by the determination circuit unit 11A, and after the recognition of the gesture, issues a gesture event to the execution circuit unit 11B.

In this embodiment, when receiving a request of a gesture of a kind necessary to execute an application from the execution circuit unit 11B at a time of starting the application, the determination circuit unit 11A sets the kind of the gesture which should be determined by the determination unit 113. The determination circuit unit 11A recognizes only the gesture of the kind requested first, and transmits the gesture to the execution circuit unit 11B as the event.

Figure 8:
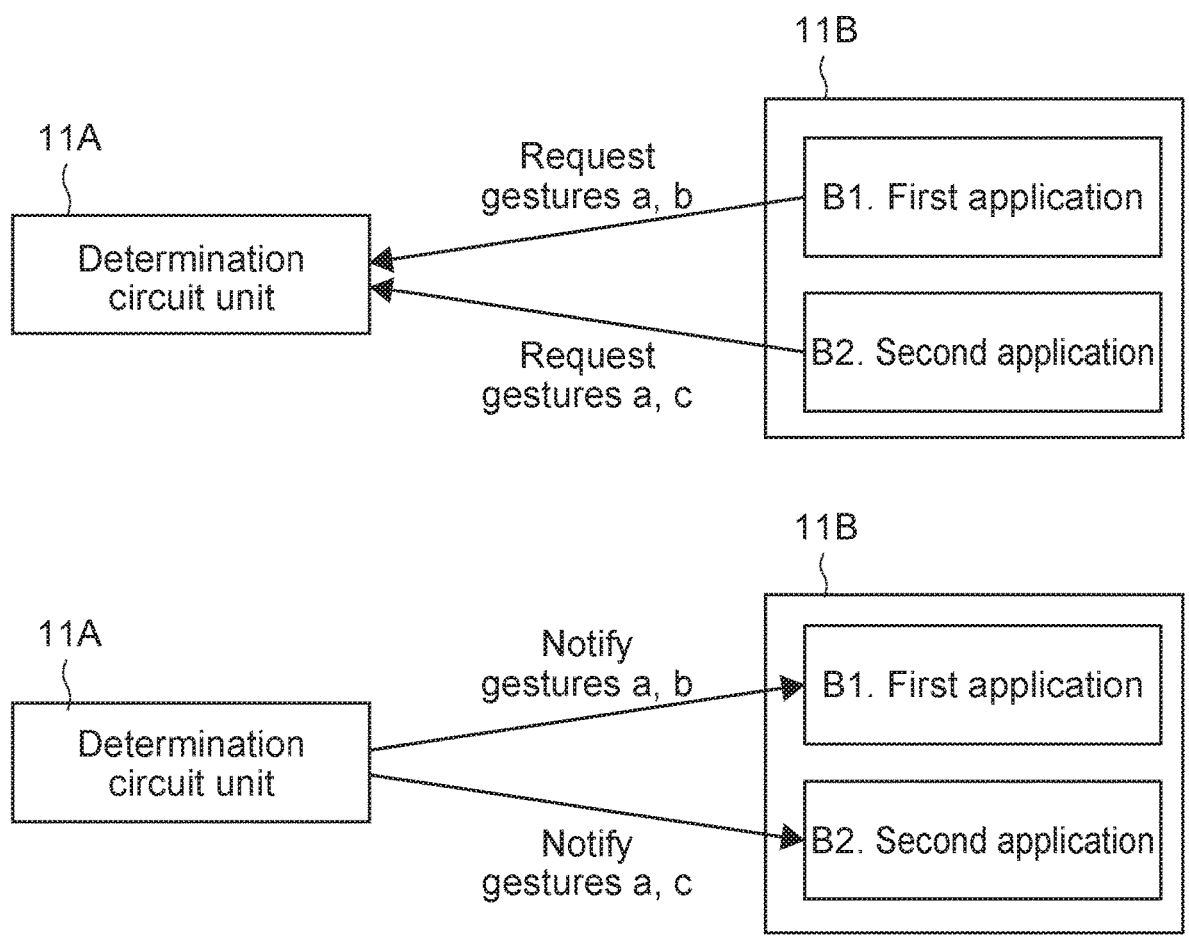
FIG. 8 A diagram for explaining an action of the information processing apparatus.

In a case where there are a plurality of applications, the setting unit 115 calculates kinds of such gestures as to cover just a right number of gestures required by the applications, and performs a recognition process in accordance with this. For example, as shown in FIG. 8, in a case where the execution circuit unit 11B requires, as a first application B1, raising (a) and lowering (b), and as a second application B2, raising (a) and shaking gesture (c), the determination circuit unit 11A recognizes three kinds of gestures, that is, raising (a), lowering (b), and shaking (c), and notifies the requesting applications of the event.

According to this embodiment, because the number of gesture candidates that should be determined is limited, a computation load on the determination unit 13 is reduced, and the processing time and electric power necessary to perform the computation process can be reduced.

On the other hand, as described above, the determination circuit unit 11A receives the gesture recognition requests from the plurality of applications, and recognizes the required gestures. In some cases, depending on the kind of the gesture, a trigger function, a determination device used for the gesture determination, and a necessary acceleration sensor mode may be different. This is varied depending on a request from the application or a state of the arm or the terminal at that time. That is, the gestures recognized by the determination circuit unit 11A are varied depending on not only the request from the application but also the state of the arm of the user.

In view of this, in this embodiment, the determination circuit unit 11A is capable of changing a generation standard of the trigger signal in the signal generation unit 110 depending on the kind of the gesture to be recognized. Examples of the generation standard of the trigger signal include a sampling frequency of the acceleration sensor (sensor unit 13), a cutoff frequency of the low-pass filter, a trigger determination function of the threshold value or the like of the threshold value determination circuit 104, and the like. Changing the generation standard of the trigger signal is performed in the setting unit 115, for example.

For example, in a case of recognizing only raising and lowering, a sampling frequency of the acceleration sensor is set to be lower. In a case of using a gesture associated with a motion, the sampling frequency of the acceleration sensor is set to be higher.

That is, in the arm gesture recognition, at a time of recognizing four kinds of the arm raising and lowering gestures (arm_up, arm_down), an arm twisting gesture (twist), and an arm shaking gesture (shake), a position of the arm is changed between arm_up and arm_down at a time of starting the gesture and at a time of ending the gesture. Therefore, lowering a frequency of the acceleration sensor and observing a direction change of a gravitational acceleration as the trigger function are sufficient. On the other hand, in a case of the twist and the shake, the position of the arm is not changed at the start time and at the end time. For this reason, it is necessary to observe the motion itself, the frequency of the acceleration sensor has to be set to be higher, and as the trigger function, the arm motion itself has to be observed. The former mode and the latter mode do not exist at the same time. As a state of the terminal, one of the modes is selected. In this case, switching between the former mode and the latter mode is decided on the basis of whether a recognition of the twist/shake is necessary or not in response to a request of the application.

Further, the change in position of the arm is generated in the case of the raising and the lowering, so such a trigger as to be generated with a difference can be used. Meanwhile, in the case of the shaking and the twisting, the position of the arm is returned to an original position, so a trigger is set in such a manner that not a difference but a norm of the acceleration exceeds a fixed value, for example. That is, in FIG. 4, a function of the difference circuit 102 is invalidated. As a result, it is possible to select a trigger with a lowest error generation rate, and in accordance with a condition, it is possible to reduce the power consumption of the sensor unit 13 and the signal generation unit 110.

Third Embodiment

Subsequently, a third embodiment of the present technology will be described.

Figure 9:
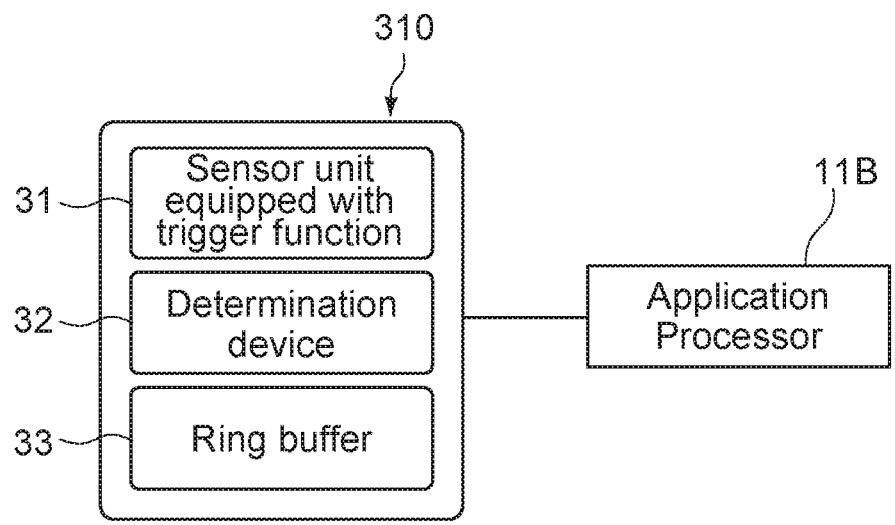
FIG. 9 A block diagram showing a configuration an information processing apparatus according to a third embodiment of the present technology.

FIG. 9 is a block diagram showing a configuration of a sensor apparatus 310 as an information processing apparatus in this embodiment. In the following, configurations different from the first embodiment will be mainly described. Configurations similar to those of the first embodiment will be denoted by similar reference numerals or symbols, and a description of those will be omitted or simplified.

The sensor apparatus 310 includes a sensor unit 31 equipped with the trigger function, a CPU 32, and a ring buffer 33. The sensor unit 31 corresponds to a mixed circuit of the sensor unit 13 and the signal generation unit 110 in the first embodiment. The determination device 32 corresponds to the determination unit 113 in the first embodiment, and is started up upon reception of a trigger signal from the sensor unit 31. The ring buffer 33 corresponds to the ring buffer 114 in the first embodiment.

It should be noted that the determination device 32 may be provided with the first and second determination devices 111, 112 as in the first embodiment, or may be provided with one of those. In the following, an example is used in which the determination device 32 is constituted of a single CPU.

In this embodiment, the sensor unit 31 itself has a trigger function, and causes the determination device 32 which is normally in hibernation to be activated by a trigger. A function which can be used as the trigger may be limited. For example, it is possible to provide only such a simple function that a specific axis exceeds a threshold value, or absolute values of all the axes exceed threshold values.

There are two triggers effective for a wristband type wearable device:
(a) generated when an output of the acceleration sensor in the Z axis direction exceeds the threshold value, and
(b) generated when a difference with a preceding frame of the output of the acceleration sensor in each of the X, Y, and Z axis direction exceeds the threshold value. The former corresponds to a case where the screen (display unit 16) is directed upwards, and the latter corresponds to a case where a motion is caused.

Here, when the trigger (a) is used, an erroneous generation of the trigger during walking or running is less caused. However, in a condition in which the screen is already faced upwards, for example, during working while sitting down at a desk, the trigger cannot be generated. On the other hand, when the trigger (b) is used, the trigger can be generated in various conditions including sitting down at a desk. However, the erroneous generation is often caused during walking or running.

In view of this, in this embodiment, depending on the position of the arm, the trigger of (a) and the trigger of (b) are separately used. Just before the determination device 32 is shifted to the hibernation from an activation state, in accordance with the position of the arm at that time, a determination function of a trigger detection circuit is set.

That is, the output of the sensor unit 31 includes a signal related to a motion along multiaxial directions including a gravity direction (Z axis direction). The sensor apparatus 310 has a plurality of detection standards related to a state change which are different from each other depending on a posture just before detecting the state change of the posture of the arm. Specifically, the sensor apparatus 310 switches between a first detection mode in which the state change is detected in accordance with the state of the arm in a case of a preceding gesture recognition on the basis of a form of the motion of the arm along the gravity direction and a second detection mode in which the state change is detected on the basis of a form of the motion of the detection target in the multiaxial directions and achieves execution.

For example, at a time when the arm is lowered, a trigger (hereinafter, also referred to as Z axis trigger) based on the fact that an output of the acceleration sensor in the Z axis direction exceeds the threshold value is set. At a time when the arm is raised, a trigger (hereinafter, also referred to as motion trigger) based on the fact that a norm of an output of the acceleration sensor in the triaxial direction exceeds the threshold value is set. When the trigger is generated, lighting the screen may not have to be performed in some cases. Even in such a case, a trigger which should be set next time is determined by calculation every time.

By setting the Z axis trigger at a time when the arm is lowered, it is possible to reduce an erroneous generation rate without an additional circuit such as a low-pass filter even in an environment in which the erroneous generation is likely to be caused, for example, during an active movement like walking or running. Further, by switching to the motion trigger using all the axes at a time when the arm is raised, it is possible to turn on the screen by slightly twisting a wrist during working at a desk. By switching the trigger without turning on the screen, it is possible to light the screen by a natural motion at all times without being aware of a current mode by the user.

Examples of a specific algorism of the motion trigger include generation when an absolute value of each axis of the acceleration sensor of a wristband becomes a value significantly larger than 1 G (for example, 1.2 G). In addition, in any one of the axes, when a difference of the acceleration with a preceding frame is significantly larger than 0 (for example, 0.2 G), the generation may be caused. As the specific algorism of the Z axis trigger, exceeding a threshold value (for example, 0.6 G) by the acceleration in the Z axis direction may be preferably used. The motion trigger is appropriate to a case where the arm is raised, for example, during working at a desk. The Z axis trigger is appropriate to a case where the arm is lowered, for example, during walking or lowering the arm while sitting on a sofa.

Figure 10:
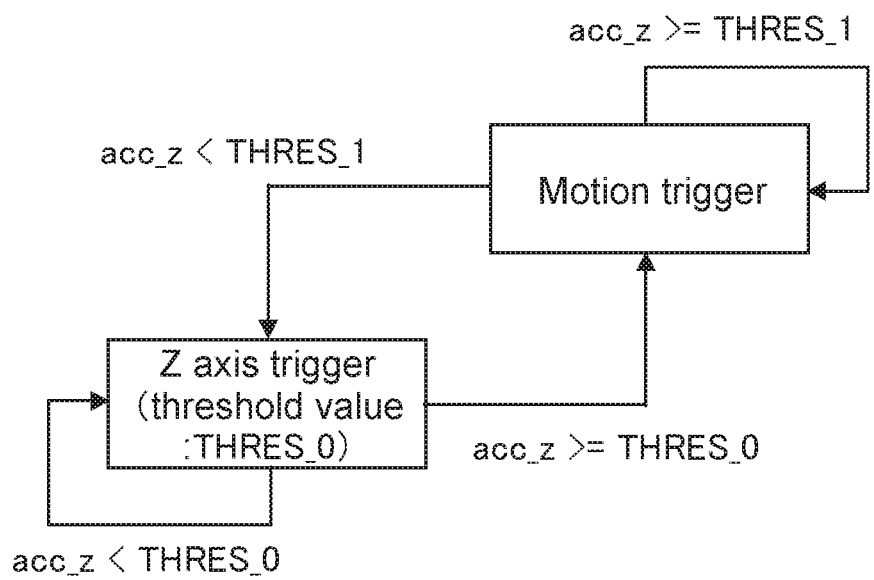
FIG. 10 A diagram for explaining an action of the information processing apparatus.
Figure 11:
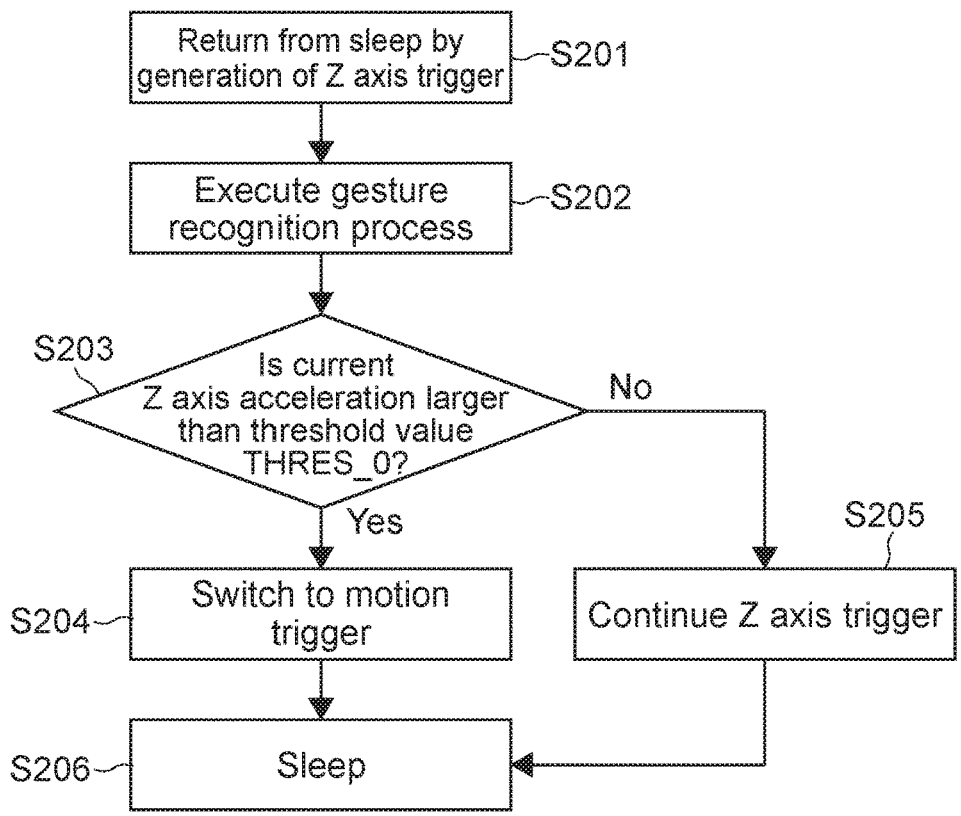
FIG. 11 A flowchart for explaining an operation example of the information processing apparatus.
Figure 12:
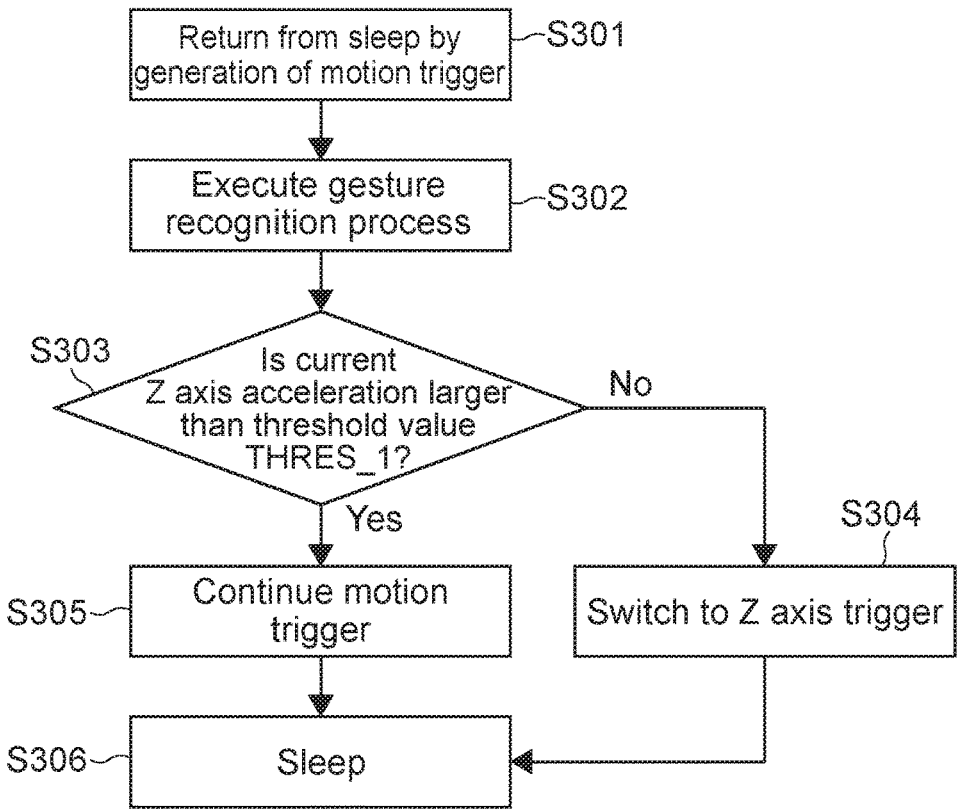
FIG. 12 A flowchart for explaining an operation of the information processing apparatus.

FIG. 10 is a diagram for explaining a transition relationship between the Z axis trigger and the motion trigger. FIG. 11 and FIG. 12 each are a flowchart for explaining an operation example of the sensor apparatus 310.

In this case, an example will be described in which switching of the triggers is performed with Z axis acceleration acc_z. The Z axis trigger detects a motion of the arm. The motion trigger detects a change of a posture of an upper surface of the arm, namely, a posture in a direction of a dial face of a watch.

The Z axis trigger is generated when the Z axis acceleration acc_z exceeds a first threshold value THRES_0, and the determination device 32 is returned from hibernation (sleep state) (Step 201). After the process associated with the trigger (gesture recognition process by the determination device 32) is terminated, a degree of the Z axis acceleration acc_z is determined (Steps 202 and 203). In a case where the Z axis acceleration acc_z exceeds THRES_0 continuously, the detection mode is switched to the motion trigger (Step 204). In another case, the Z axis trigger is maintained (Step 205). In a case of the motion trigger mode, the generation is caused by referring to an absolute value of each axis. After that, the determination device 32 is brought into the hibernation (Step 206).

The motion trigger is generated when the Z axis acceleration acc_z exceeds a second threshold value THRES_1, and the determination device 32 is returned from the hibernation (sleep state) (Step 301). After the process associated with the trigger (gesture recognition process by the determination device 32) is terminated, the Z axis acceleration acc_z and the second threshold value THRES_1 are compared (Step 303). In a case of being smaller than THRES_1, the trigger is switched to the Z axis trigger (Step 304). In a case of being not smaller than THRES_1, the motion trigger is maintained (Step 305). It is desirable that THRES_1 be set to be smaller than THRES_0. As a result, in a case where the Z axis acceleration acc_z is vibrated within a range close to THRES_0, it is possible to prevent the trigger from being frequently generated.

The embodiments of the present technology are described above. The present technology is not limited to the above embodiments, and can of course be variously modified.

For example, in the above embodiments, as the information processing apparatus 1, the wearable device of the wristband type is used as an example, but is not limited to this. The present technology can be applied to a glasses-type wearable device. In this case, it is possible to recognize a predetermined gesture (nodding, shaking a head, or the like) from a motion of a head of a user.

Further, in the above embodiments, the information processing apparatus 1 provided with the sensor unit 13 is used as an example. However, the sensor unit 13 and the control unit 11 may be separately configured. For example, the control unit 11 may be configured as a handheld terminal or a server device which can communicate with the sensor unit 13 via a wireless network or the like.

Further, the generation algorism of the sensor trigger described in the third embodiment may be applied to the signal generation unit 110 in the first and second embodiments.

Further, in the above embodiments, the information processing apparatus used to perform the gesture recognition of the user is used as an example. In addition to this, for example, the present technology can be applied to posture determination or posture control for a vehicle or an unmanned autonomous flying body.

Further, in the above embodiments, as the state change of the detection target, the posture change of the user is used as an example. In addition to this, the information processing apparatus may be configured in such a manner that a state change such as a voice and a heart rate of the user may be detected and recognized.

It should be noted that the present technology can take the following configurations.

(1) An information processing apparatus, including:

a signal generation unit that processes an output of a sensor unit attached to a detection target, and generates a trigger signal at a time when a state change of the detection target is detected;

a first determination unit that is brought out of hibernation and activated when receiving the trigger signal, determines the state change of the detection target from the output of the sensor unit by a first determination criterion, and outputs a determination impossibility signal in a case where the determination is impossible; and a second determination unit that is brought out of hibernation and activated when receiving the determination impossibility signal, and determines the state change of the detection target from the output of the sensor unit by a second determination criterion different from the first determination criterion.

(2) The information processing apparatus according to (1), in which the signal generation unit detects a motion of a user who wears the detection target from the state change of the detection target, and the first determination unit and the second determination unit determine, on a basis of a mode of the motion of the user, whether a corresponding gesture candidate exists or not from among a plurality of gesture candidates set in advance.

(3) The information processing apparatus according to (2), in which the first determination unit executes a first determination process of specifying a gesture candidate corresponding to the mode of the motion of the user from among the plurality of gesture candidates, and outputs the determination impossibility signal in a case where specifying the gesture candidate is impossible.

(4) The information processing apparatus according to (2) or (3), in which the second determination unit executes a second determination process of specifying a gesture candidate having a highest correlation with the mode of the motion of the user from among the plurality of gesture candidates.

(5) The information processing apparatus according to any one of (2) to (4), further including:

a setting unit that sets the plurality of gesture candidates, in which the signal generation unit changes a standard by which the trigger signal is generated in accordance with a kind of the plurality of gesture candidates set.

(6) The information processing apparatus according to any one of (2) to (5), in which the signal generation unit detects a motion of an arm of the user who wears the detection target, and the first determination unit and the second determination unit each specify any one of a raising operation, a lowering operation, a twisting operation, and a shaking operation of the arm of the user.

(7) The information processing apparatus according to any one of (1) to (6), in which the first determination unit and the second determination unit are brought into hibernation again after the state change of the detection target is determined.

(8) The information processing apparatus according to any one of (1) to (7), further including:

a buffer memory capable of chronologically storing the output of the sensor unit.

(9) The information processing apparatus according to any one of (1) to (8), in which the signal generation unit generates the trigger signal at a time when a state change relating to a posture of the detection target.

(10) The information processing apparatus according to any one of (1) to (9), in which the second determination unit involves power consumption higher than that of the first determination unit.

(11) The information processing apparatus according to any one of (1) to (10), further including:

a casing for storing the signal generation unit, the first determination unit, and the second determination unit, in which the casing is capable of being attached to the detection target.

(12) An information processing method, including:

bringing out of hibernation and activating a first determination unit which determines a state change of a detection target by a first determination criterion, when the state change of the detection target is detected on a basis of an output of a sensor unit attached to the detection target; and bringing out of hibernation and activating a second determination unit which determines the state change of the detection target by a second determination criterion different from the first determination criterion, when the first determination unit is incapable of performing determination.

(13) A program causing a computer to execute the steps of:

bringing out of hibernation and activating a first determination unit which determines a state change of a detection target by a first determination criterion, when the state change of the detection target is detected on a basis of an output of a sensor unit attached to the detection target; and bringing out of hibernation and activating a second determination unit which determines the state change of the detection target by a second determination criterion different from the first determination criterion, when the first determination unit is incapable of performing determination.

(14) An information processing apparatus, including:

a setting unit that sets a plurality of gesture candidates to be determined;

a signal generation unit that processes an output of a sensor unit attached to a user, and generates a trigger signal at a time when a state change relating to a motion of the user is detected on a basis of a predetermined detection standard defined in accordance with the plurality of gesture candidates; and a determination unit that is brought out of hibernation and activated when receiving the trigger signal, and determines, on a basis of the output of the sensor unit, whether a gesture candidate corresponding to a mode of the motion of the user exists or not among the plurality of gesture candidates.

(15) The information processing apparatus according to (14), in which the signal generation unit has a plurality of detection standards relating to the state change which are different from each other in accordance with a state change of a detection target immediately before the state change is detected.

(16) An information processing apparatus, including:
a signal generation unit that processes an output of a sensor unit attached to a user, and generates a trigger signal at a time when a state change relating to a motion of the user is detected on a basis of a predetermined detection standard; and
a determination unit that is brought out of hibernation and activated when receiving the trigger signal, executes a determination process for determining whether a gesture candidate corresponding to a mode of the motion of the user exists or not among the plurality of gesture candidates, and is brought into hibernation again after the determination process is executed, in which
the signal generation unit switches the predetermined detection standard in accordance with the state change of the user at a time when the determination unit is brought into hibernation.

(17) The information processing apparatus according to (16), in which
the output of the sensor unit includes a signal relating to a motion along multiaxial directions including a gravity direction, and
the signal generation unit selectively switches a first detection mode in which the state change is detected on a basis of the mode of the motion of the user in the gravity direction and a second detection mode in which the state change is detected on a basis of a temporal change of the mode of the motion of the user in the multiaxial directions.

REFERENCE SIGNS LIST 1 information processing apparatus
11 control unit
11A determination circuit unit
11B execution circuit unit
13 sensor unit
16 display unit
110 signal generation unit
111 first determination device
112 second determination device
114 ring buffer
115 setting unit
310 sensor apparatus

The invention claimed is:

1. An information processing apparatus, comprising:
a signal generation unit configured to
process an output of a sensor attached to a detection target,
detect a position and a motion of a body part of a user who wears the detection target from a state change of the detection target according to the output of the sensor, and
generate a trigger signal at a time when the state change of the detection target is detected based on the detected position and the detected motion of the body part of the user;
a first determination unit configured to
come out of hibernation and activate upon receiving the trigger signal,
determine a gesture corresponding to the state change of the detection target from the output of the sensor by a first determination criterion, and
output a determination impossibility signal in a case where the first determination unit is incapable of determining the gesture corresponding to the state change of the detection target; and
a second determination unit configured to
come out of hibernation and activate upon receiving the determination impossibility signal, and
determine the gesture corresponding to the state change of the detection target from the output of the sensor by a second determination criterion different from the first determination criterion,
wherein the signal generation unit is further configured to determine different respective detection standards for generating the trigger signal based on different respective detected positions of the body part of the user immediately before the motion of the body part of the user is detected, and
wherein the signal generation unit, the first determination unit, and the second determination unit are each implemented via at least one processor.

2. The information processing apparatus according to claim 1,
wherein the first determination unit and the second determination unit determine the gesture, on a basis of a mode of the motion of the user, according to whether a corresponding gesture candidate exists or not from among a plurality of gesture candidates set in advance.

3. The information processing apparatus according to claim 2,
wherein the first determination unit is further configured to
execute a first determination process of specifying a gesture candidate corresponding to the mode of the motion of the user from among the plurality of gesture candidates, and
output the determination impossibility signal in a case where specifying the gesture candidate is impossible.

4. The information processing apparatus according to claim 2,
wherein the second determination unit executes a second determination process of specifying a gesture candidate having a highest correlation with the mode of the motion of the user from among the plurality of gesture candidates.

5. The information processing apparatus according to claim 2, further comprising:
a setting unit configured to set the plurality of gesture candidates,
wherein the signal generation unit is further configured to change a standard by which the trigger signal is generated in accordance with a kind of the plurality of gesture candidates set, and
wherein the setting unit is implemented via at least one processor.

6. The information processing apparatus according to claim 2,
wherein the body part of the user includes an arm of the user who wears the detection target, and
wherein the first determination unit and the second determination unit are each further configured to specify any one of a raising operation, a lowering operation, a twisting operation, or a shaking operation as the gesture corresponding to state change based on the detected motion of the arm of the user.

7. The information processing apparatus according to claim 1,
wherein the first determination unit and the second determination unit are brought into hibernation again after the gesture corresponding to the state change of the detection target is determined.

8. The information processing apparatus according to claim 1, further comprising:
a buffer memory capable of chronologically storing the output of the sensor,
wherein the buffer memory is implemented via at least one non-transitory computer-readable storage medium.

9. The information processing apparatus according to claim 1,
wherein the signal generation unit generates the trigger signal at a time when the state change is detected relating to a posture of the detection target.

10. The information processing apparatus according to claim 1,
wherein the second determination unit involves power consumption higher than that of the first determination unit.

11. The information processing apparatus according to claim 1, further comprising:
a casing configured to store the signal generation unit, the first determination unit, and the second determination unit,
wherein the casing is further configured to be attached to the detection target.

12. An information processing method, comprising:
generating a trigger signal at a time when a state change of a detection target is detected based on a detected position and a detected motion of a body part of a user;
bringing out of hibernation and activating a first determination unit which determines a gesture corresponding to the state change of the detection target by a first determination criterion upon receiving the trigger signal, when the state change of the detection target is detected on a basis of an output of a sensor attached to the detection target, and outputs a determination impossibility signal when the first determination unit is incapable of determining the gesture corresponding to the state change of the detection target; and
bringing out of hibernation and activating a second determination unit which determines the gesture corresponding to the state change of the detection target by a second determination criterion different from the first determination criterion upon receiving the determination impossibility signal,
wherein different respective detection standards are determined for generating the trigger signal based on different respective detected positions of the body part of the user immediately before the motion of the body part of the user is detected.

13. A non-transitory computer-readable storage medium having embodied thereon a program, which when executed by a processor of a computer causes the computer to execute a method, the method comprising:
generating a trigger signal at a time when a state change of a detection target is detected based on a detected position and a detected motion of a body part of a user;
bringing out of hibernation and activating a first determination unit which determines a gesture corresponding to the state change of the detection target by a first determination criterion upon receiving the trigger signal, when the state change of the detection target is detected on a basis of an output of a sensor attached to the detection target, and outputs a determination impossibility signal when the first determination unit is incapable of determining the gesture corresponding to the state change of the detection target; and
bringing out of hibernation and activating a second determination unit which determines the gesture corresponding to the state change of the detection target by a second determination criterion different from the first determination criterion upon receiving the determination impossibility signal,
wherein different respective detection standards are determined for generating the trigger signal based on different respective detected positions of the body part of the user immediately before the motion of the body part of the user is detected.

14. The information processing apparatus according to claim 1,
wherein the signal generation unit is further configured to store the processed output of the sensor in a ring buffer.

* * * * *